(12) United States Patent
Li

(10) Patent No.: US 10,913,309 B2
(45) Date of Patent: Feb. 9, 2021

(54) PORTABLE ESCAPE DEVICE FOR SELF-RESCUE IN CASE OF AUTO TYRE BEING TRAPPED IN PIT

(71) Applicant: SUZHOU JILIXING AUTOMOTIVE SUPPLIES TECHNOLOGY CO., LTD., Suzhou (CN)

(72) Inventor: Xingyan Li, Suzhou (CN)

(73) Assignee: SUZHOU JILIXING AUTOMOTIVE SUPPLIES TECHNOLOGY CO., LTD., Jiangsu (CN)

( * ) Notice: Subject to any disclaimer, the term of this patent is extended or adjusted under 35 U.S.C. 154(b) by 315 days.

(21) Appl. No.: 15/760,221

(22) PCT Filed: Feb. 2, 2016

(86) PCT No.: PCT/CN2016/073190
§ 371 (c)(1),
(2) Date: Mar. 14, 2018

(87) PCT Pub. No.: WO2017/128450
PCT Pub. Date: Aug. 3, 2017

(65) Prior Publication Data
US 2018/0250980 A1  Sep. 6, 2018

(30) Foreign Application Priority Data
Jan. 27, 2016  (CN) .......................... 2016 1 0053176

(51) Int. Cl.
*B60B 15/00* (2006.01)
*B60C 27/02* (2006.01)
(Continued)

(52) U.S. Cl.
CPC .............. *B60B 15/00* (2013.01); *B60B 15/18* (2013.01); *B60B 15/266* (2013.01);
(Continued)

(58) Field of Classification Search
CPC ... B60C 27/02; B60C 27/023; B60C 27/0261; B60C 27/0269; B60C 27/0276;
(Continued)

(56) References Cited

U.S. PATENT DOCUMENTS 3,130,768 A * 4/1964 Marten .................... B60C 27/10
152/218
3,138,189 A * 6/1964 Minutilla ................ B60C 27/10
152/216

(Continued)

FOREIGN PATENT DOCUMENTS

CN      204820982 U * 12/2015 ............. B60C 27/04

*Primary Examiner* — Jason R Bellinger
(74) *Attorney, Agent, or Firm* — Proi Intellectual Property US; Klaus Michael Schmid

(57) ABSTRACT

A portable escape device is provided for self-rescue in the case of an auto tyre being trapped in a pit. The portable escape device includes support posts, a clamping device fitted to the support posts, and a jacking device fitted to the clamping device. The support posts are fixedly mounted onto spokes. The clamping device clamps an auto tyre. The jacking device protrudes and extends out of a top face of a tyre portion. The portable escape device can release the trapped auto tyre and perform self-rescue fast and reliably, and it is convenient to carry.

17 Claims, 11 Drawing Sheets

(51) Int. Cl.
  *B60B 15/26* (2006.01)
  *B60B 15/18* (2006.01)
  *B60C 27/04* (2006.01)

(52) U.S. Cl.
  CPC .......... *B60C 27/0269* (2013.01); *B60C 27/04* (2013.01); *B60B 2900/551* (2013.01); *B60B 2900/721* (2013.01); *B60B 2900/731* (2013.01)

(58) Field of Classification Search
  CPC ......... B60C 27/04; B60B 15/00; B60B 15/18; B60B 15/266
  See application file for complete search history.

(56) References Cited

U.S. PATENT DOCUMENTS

| | | | | |
|---|---|---|---|---|
| 4,278,122 A * | 7/1981 | Vagias | ................... | B60C 27/04 152/225 C |
| 4,287,926 A * | 9/1981 | Wong | ..................... | B60C 27/04 152/225 C |
| 4,306,604 A * | 12/1981 | Snider | ..................... | B60C 27/02 152/225 R |
| 4,386,643 A * | 6/1983 | Belknap, III | ........... | B60C 27/04 152/216 |
| 4,576,214 A * | 3/1986 | Preusker | ............... | B60C 27/045 152/213 A |
| 4,960,159 A * | 10/1990 | Oda | ........................ | B60C 27/04 152/213 A |
| 5,076,335 A * | 12/1991 | Koshi | .................... | B60C 27/12 152/219 |
| 5,156,695 A * | 10/1992 | Martin | ................... | B60C 27/04 152/216 |
| 6,401,775 B1 * | 6/2002 | Sood | ...................... | B60C 27/04 152/225 C |
| 6,983,778 B1 * | 1/2006 | Pitts | ....................... | B60B 15/22 152/216 |
| 7,426,949 B2 * | 9/2008 | Chaisson, Jr. | .......... | B60C 27/04 152/218 |

* cited by examiner

PORTABLE ESCAPE DEVICE FOR SELF-RESCUE IN CASE OF AUTO TYRE BEING TRAPPED IN PIT

CROSS REFERENCE TO RELATED APPLICATIONS

The present application is the US national stage of International Patent Application PCT/CN2016/073190 filed on Feb. 2, 2016, which, in turn, claims priority to Chinese Patent Application CN 201610053176.2 filed on Jan. 27, 2016.

TECHNICAL FIELD

The present invention relates to a type of technical escape equipment for self-rescue in the case of an auto being trapped in a pit, and in particular to a portable escape device for self-rescue in the case of an auto tyre being trapped in a pit.

BACKGROUND ART

The invention of the automobile has brought great convenience to people's travel. As the automobile industry is constantly developing, people not only require the safety and comfort of driving automobiles, and also require the multifunctionality of automobiles. However, when an automobile is running in the desert or on a muddy unpaved road, due to the influence of factors such as a weather condition or a geographic environment, the tyres of the automobile will often be trapped in sand pits or earth pits, and at this moment, the automobile cannot run away and is trapped. In winter, especially the snowy climate of the north, snow is accumulated on roads, the ground is wet and slippery, many automobiles will encounter the wet and slippery problems of the roads, and accidents will take place frequently.

In the long-term running process of automobiles, phenomena, such as tyre skidding, trapping in pits and sinking, may often occur as well, and even cause accidents in severe cases, and it is even more so in the cases of rainy days in summer, ice and snow in winter and harsh road surface conditions. Therefore, auto tyre skidding prevention, sinking prevention, trapping prevention and sinking self-rescue escape measures are of great significance in ensuring the normal and safe running of vehicles.

At present, there have been a variety of tyre skidding prevention devices in the market, and anti-skid chains which are made of iron chains, gum chains or rubber chains are most common. Anti-skid chains mounted on tyres can generate great pressure on the ground and increase frictional force with the road surface, playing an anti-skid role, and thereby the running safety performance of vehicles is improved. The existing defects are difficulty in dismounting and mounting, heavy weight, tyre wear and severe pavement destruction, and the running safety of automobiles will be affected to a certain degree. Especially in the northern and northwestern regions of China, as the ice and snow period in winter is long, tens of thousands of various traffic accidents of vehicles caused by wet and slippery road surfaces, trapping in pits and sinking have occurred every year. For the reduction of casualty accidents and economic loss, the anti-skid effect of anti-skid chains in the prior art is not ideal in practical application, and sinking or trapping self-rescue measures are imperfect.

Moreover, anti-skid chains and self-rescue equipment are complex to mount and dismount, and a great deal of time and labor are consumed.

SUMMARY OF THE INVENTION

In order to solve the foregoing technical problems, the present invention provides a portable escape device for self-rescue in the case of an auto tyre being trapped in a pit, which can quickly and reliably enable the trapped auto tyre escape, and is convenient to carry.

In order to achieve the foregoing invention objective, the present invention adopts the following technical solution: disclosed is a portable escape device for self-rescue in the case of an auto tyre being trapped in a pit, wherein an auto tyre comprises wheel and a tyre portion mounted on the rim of the wheel. The portable escape device for self-rescue in the case of an auto tyre being trapped in a pit is characterized in that the escape device comprises a support post, a clamping device fitted to the support post, and a jacking device fitted to the clamping device, the support post is mounted fixedly on the wheel, the clamping device clamps the auto tyre, and the jacking device protrudes and extends out of a top face of the tyre portion.

In addition, the present invention further provides the following subsidiary technical solution:

The support post comprises a first support portion and a second support portion perpendicular to the first support portion, the top end of the first support portion is fitted to the clamping device, the second support portion is provided with a nut, and the nut is fitted to a fixing bolt at the central position of the wheel.

The clamping device comprises a support plate and a binder which are fitted to each other.

The support plate is located over the tyre and provided with a fastening slot, the top end of the first support portion passes through the fastening slot, and an upper nut and a lower nut sheathe the support portion and fixedly clamp the support plate. The binder comprises a high-strength nylon strap and a fastening portion and a fixing portion located respectively at both ends of the nylon strap.

The nylon strap binds the wheel, the fastening portion is fastened with primary end of the fastening slot, and the fixing portion is fastened with the secondary end of the fastening slot and is close to the first support portion.

The jacking device comprises a jacking head, at least one bolt, and an elastic element sheathing the bolt.

The jacking head is located over the support plate and approximately shaped like a circular arc.

The jacking head and the support plate are provided respectively with a bolt hole corresponding to the bolt, and the bolt is fitted into the bolt holes and fixedly connects the jacking head and the support plate together.

The elastic element is a spring and is located between the jacking head and the support plate.

Primary end of the support post is connected movably to the clamping device, and a bottom support is mounted at the secondary end.

A cross slide bar and a cross slider are arranged slidably in the middle of the support post, a screw is mounted on the cross slider, a nut is arranged at primary end of the screw, a square spanner is arranged at the secondary end, and the nut is fitted to a bolt at the central position of the wheel.

The clamping device comprises a claw and an internal slide rod which are fitted slidably together, wherein the claw clamps the outer surface of a tyre portion and comprises an inner claw, an outer claw, and an upper claw connected between the inner claw and the outer claw.

The inside of the claw which is in contact with the tyre portion is provided with a rubber liner.

The inner claw and the internal slide rod are connected movably, and the outer claw and the support post are connected movably.

The upper claw is provided with a slide way and a guide plate capable of sliding along the slide way.

The jacking device comprises a lifter and a jacking head fixed on the lifter.

Primary end of the lifter is mounted fixedly on the outer claw, and the secondary end is fitted to the jacking head.

The bottom of the lifter is provided with fastening legs, the outer claw is provided with support blocks, and the fastening legs are fitted to the support blocks.

The jacking head is made of metal and is curved.

In addition, the present invention further provides an escape method of the portable escape device for self-rescue in the case of an auto tyre being trapped in a pit, which comprises the following steps:
(1) the clamping device is mounted, and more specifically, the clamping device on which the jacking device has been mounted in advance is mounted fixedly on a trapped auto tyre;
(2) the support post is mounted, and more specifically, the support post is connected fixedly to the wheel of the auto tyre; and
(3) an automobile is started for escape, and as the auto tyre rotates, the jacking device is supported on the pit ground and jacks the trapped auto tyre to escape.

Finally, the present invention further provides another escape method of the portable escape device for self-rescue in the case of an auto tyre being trapped in a pit, which comprises the following steps:
(1) the clamping device is mounted, and more specifically, the clamping device is mounted fixedly on the trapped auto tyre;
(2) the support post is mounted, and more specifically, the support post is connected fixedly to the wheel of the auto tyre;
(3) the jacking device is mounted, and more specifically, the jacking device is mounted on the clamping device; and
(4) an automobile is started for escape, and as the auto tyre rotates, the jacking device is supported on the pit ground and jacks the trapped auto tyre to escape.

Compared with the prior art, the present invention has the advantages as follows: the provided portable escape device for self-rescue in the case of an auto tyre being trapped in a pit not only has a simple structure and is convenient to carry, but also is quick to mount and has safe and reliable service performance; under the situation of a bad weather, a snow-covered road surface or a harsh road condition, when an auto tyre is trapped in a pit or skids, the escape device can be used for achieving the objective of effective self-rescue and rapid escape, consequently, driving safety is increased, and the occurrence of accidents is reduced; and moreover, the escape device of the present invention is convenient and quick to assemble and disassemble, so time and labor are saved.

BRIEF DESCRIPTION OF THE DRAWINGS

In order to more clearly illustrate the technical solution of the embodiments of the present invention, the drawings which need to be used in the description of the embodiments or the prior art will be introduced briefly below. Obviously, the drawings described below are merely some embodiments of the present invention, and those of ordinary skill in the art can also obtain other drawings according to these drawings without making creative efforts.

DETAILED DESCRIPTION OF THE PREFERRED EMBODIMENTS

The technical solution of the present invention will be further non-restrictively elaborated below in reference to preferred embodiments and drawings thereof.

Embodiment 1

Figure 1:
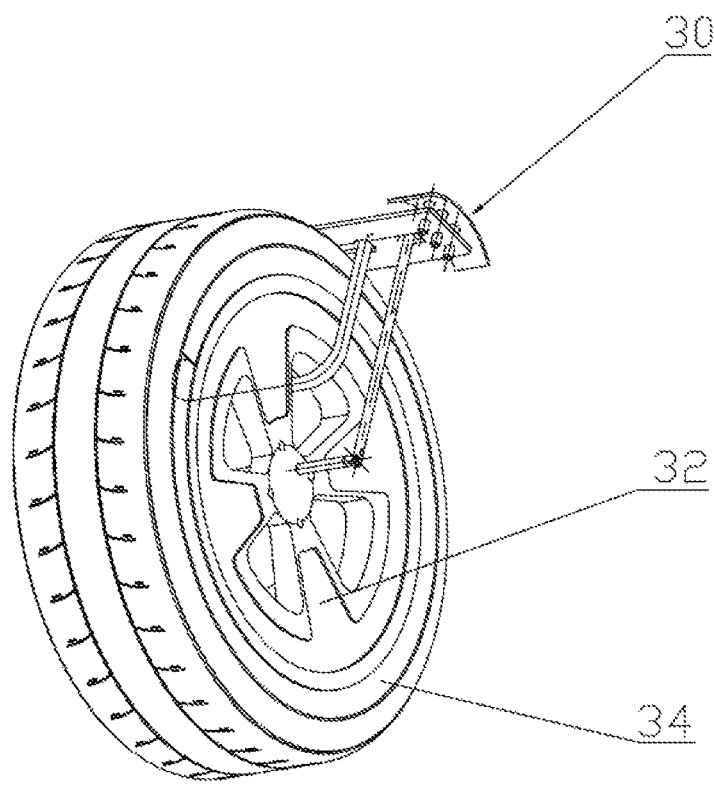
FIG. 1 is a three-dimensional diagram of assembly of a portable escape device for self-rescue in the case of an auto tyre being trapped in a pit corresponding to the first embodiment of the present invention and an auto tyre.
Figure 2:
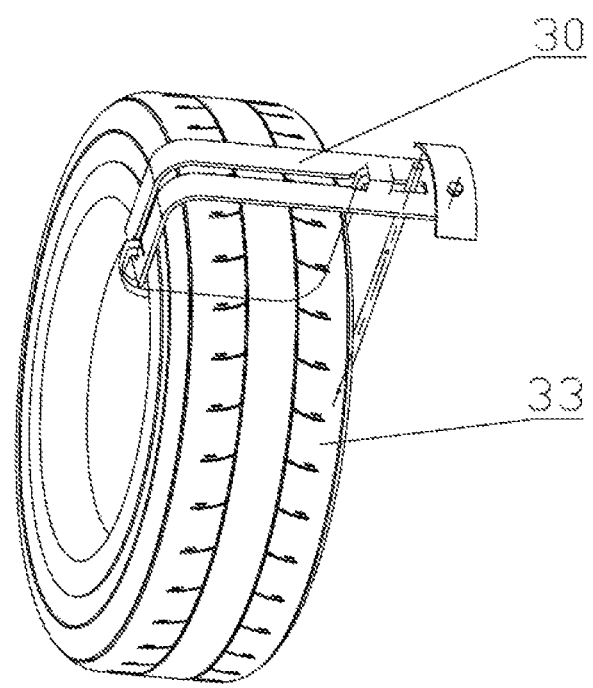
FIG. 2 is a three-dimensional view of FIG. 1 in another direction.
Figure 3:
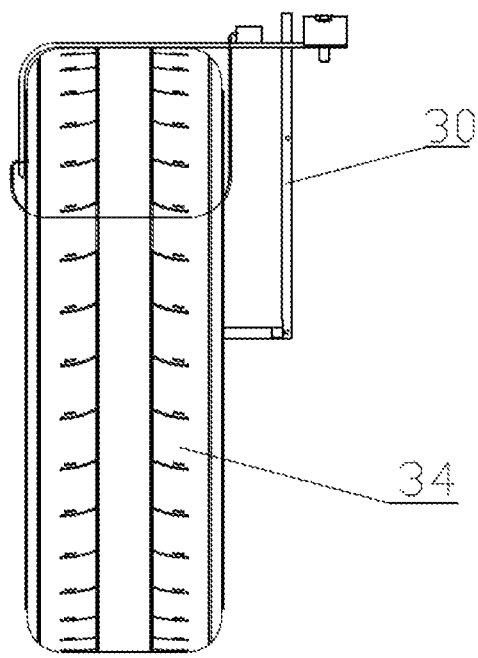
FIG. 3 is a front view of FIG. 2.
Figure 4:
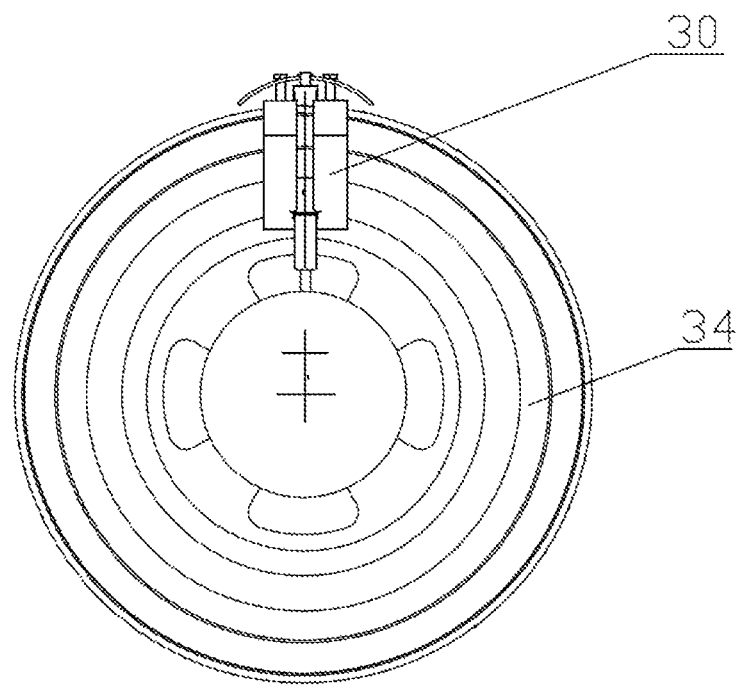
FIG. 4 is a left view of FIG. 2.
Figure 5:
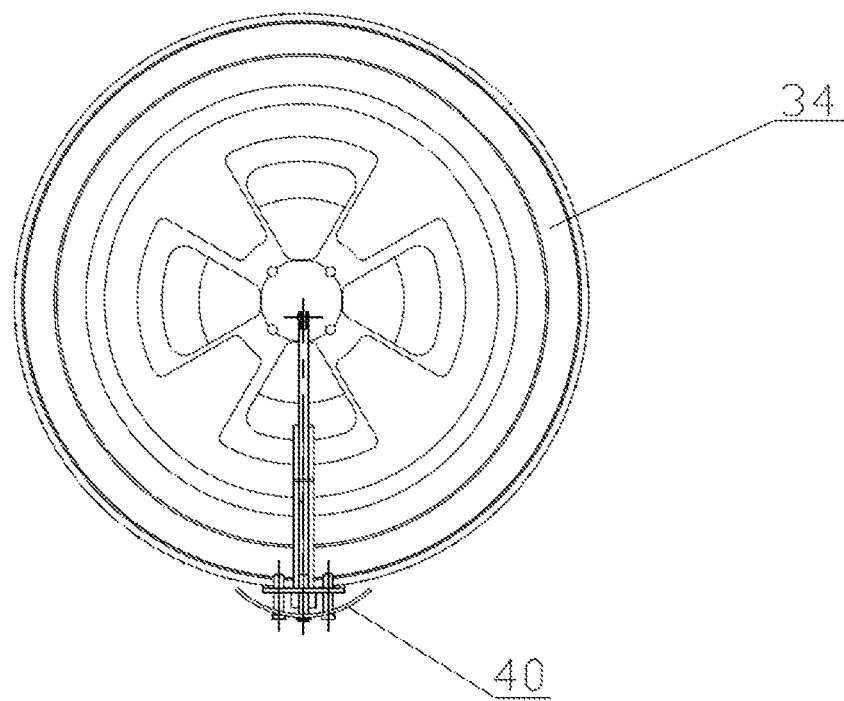
FIG. 5 is a right view of FIG. 2.

Referring to FIGS. 1-5, a portable escape device 30 for self-rescue in the case of an auto tyre being trapped in a pit is used for being quickly, safely and conveniently mounted onto an auto tyre and carry out self-rescue when the auto tyre is trapped in a pit or skids. As is well-known, the auto tyre comprises spokes 32 and a tyre portion 34 mounted on the rim of the wheel 32. Generally, a fixing bolt (not shown in the drawings) is arranged at the central position of the wheel 32.

Figure 6:
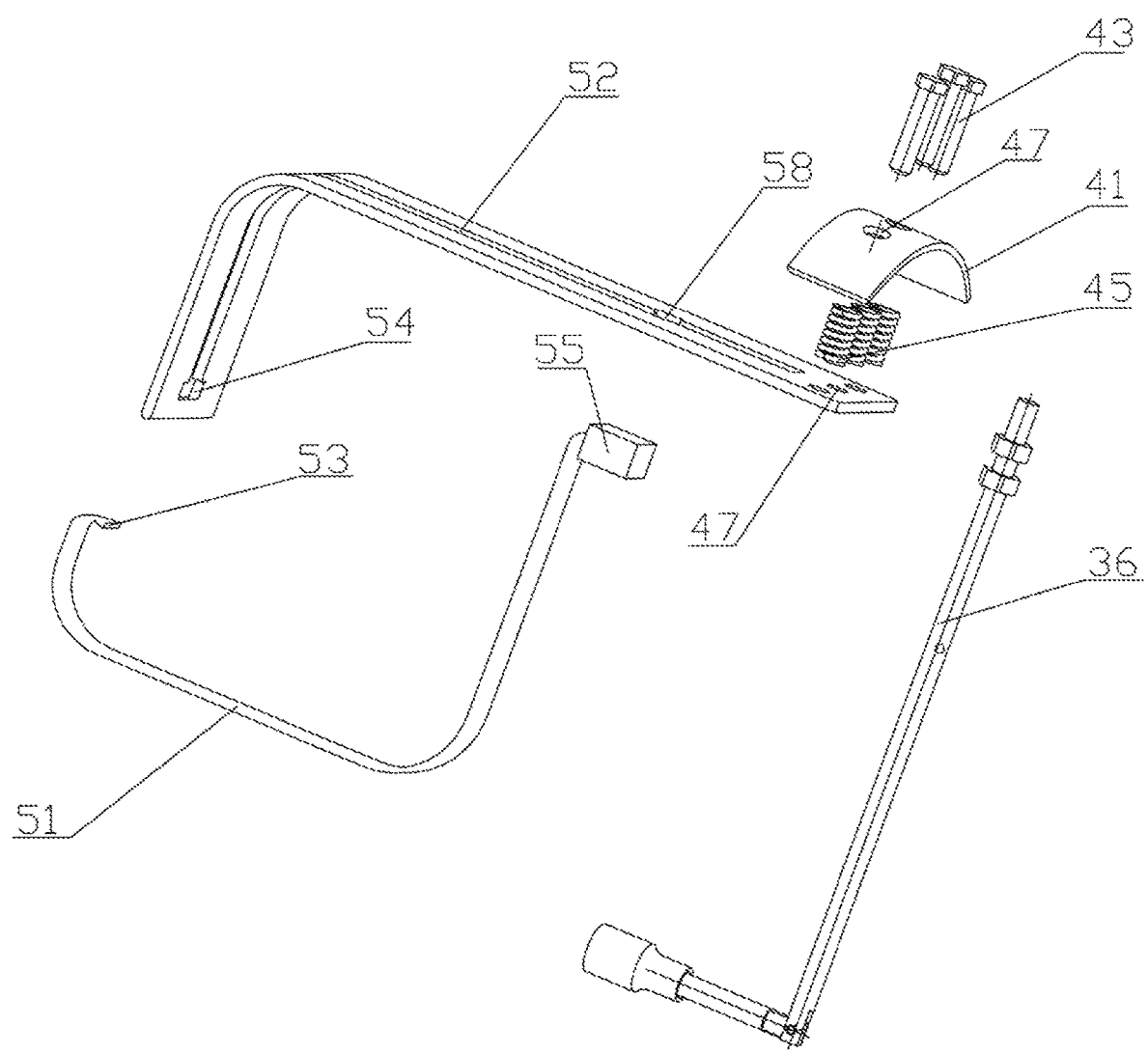
FIG. 6 is a three-dimensional exploded view of the escape device in FIG. 1.
Figure 7:
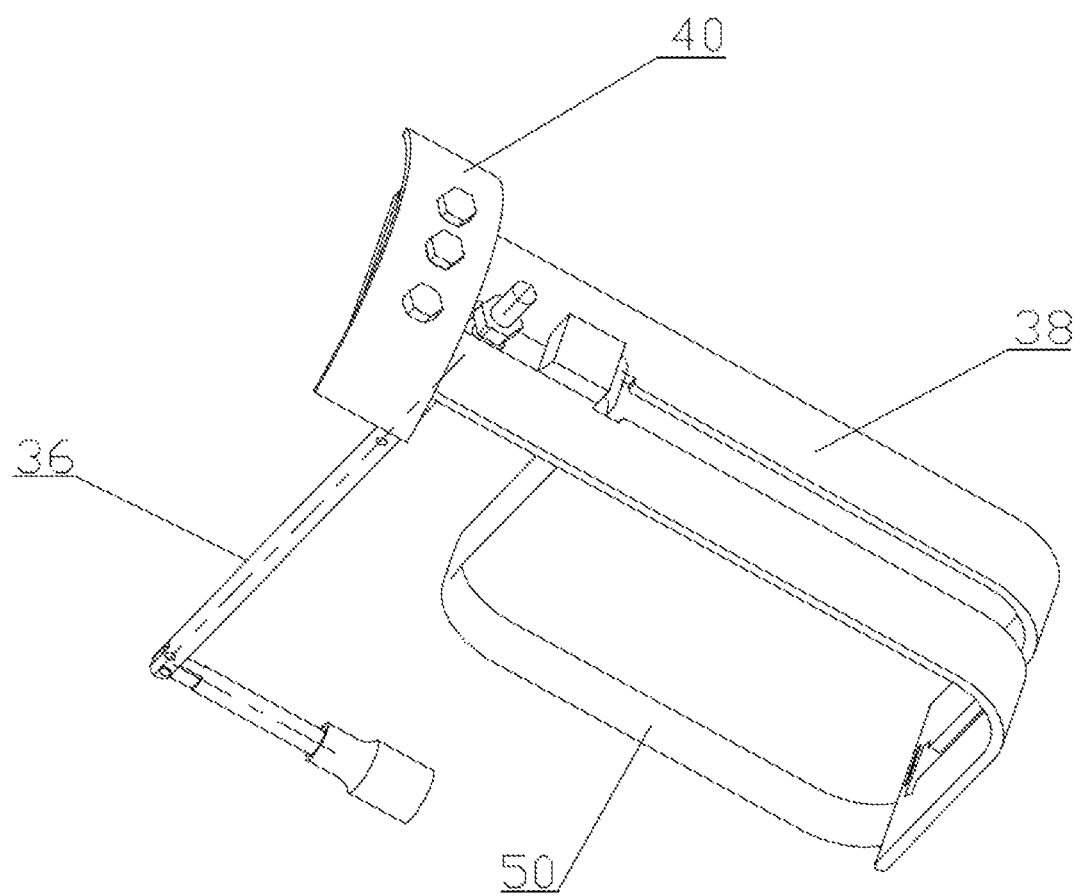
FIG. 7 is a three-dimensional assembly diagram of the escape device in FIG. 6.
Figure 8:
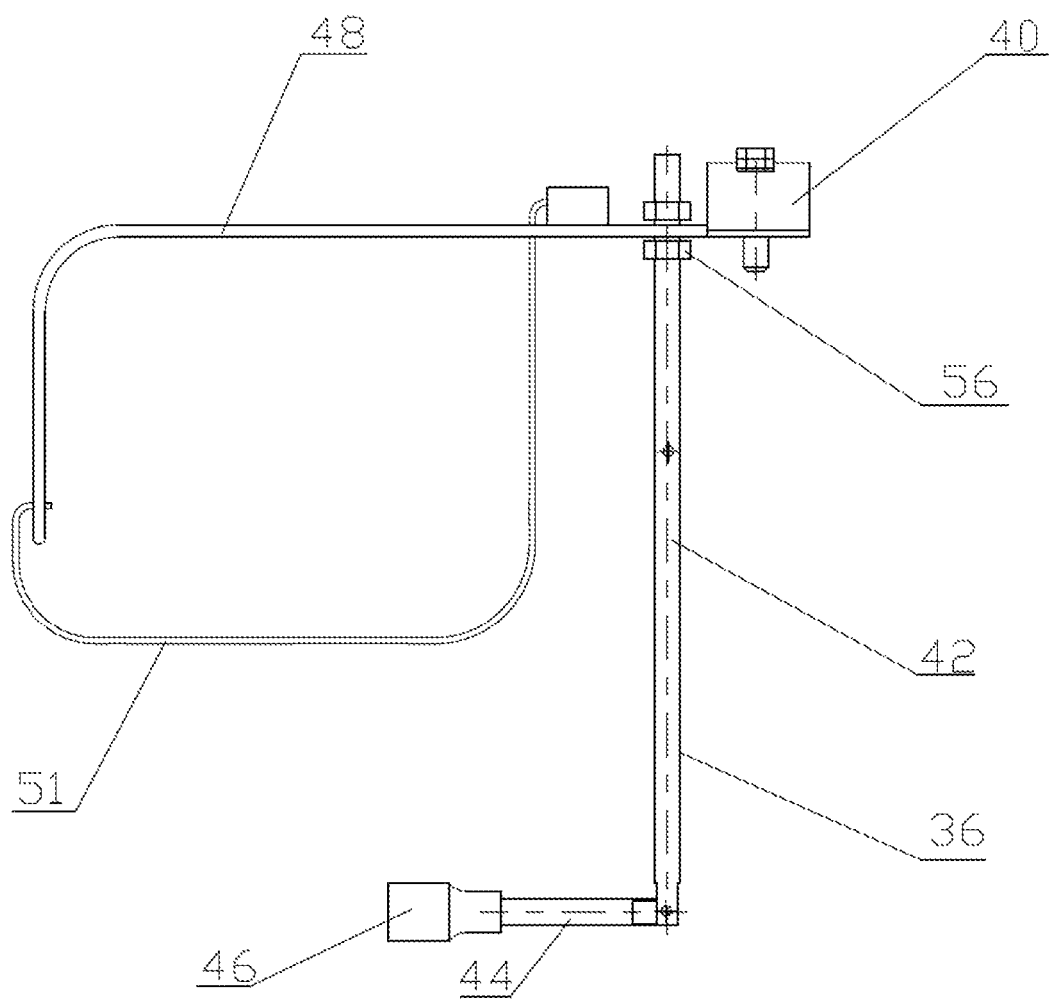
FIG. 8 is a front view of FIG. 7.
Figure 9:
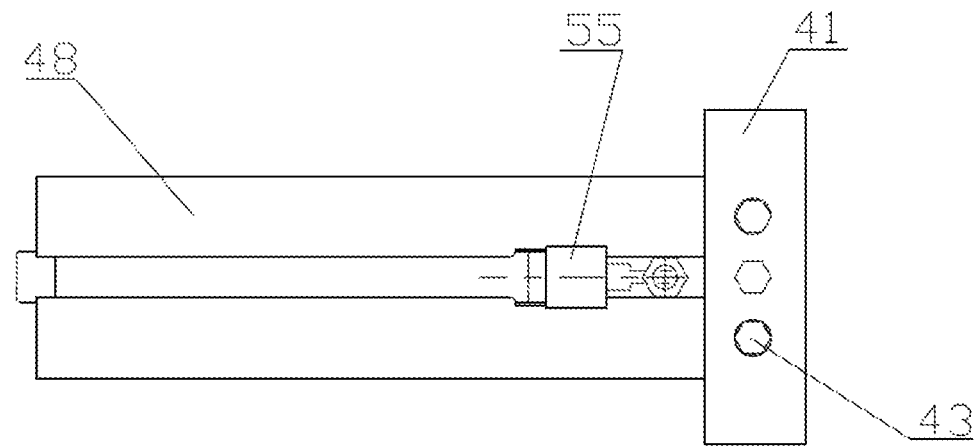
FIG. 9 is a top view of FIG. 7.
Figure 10:
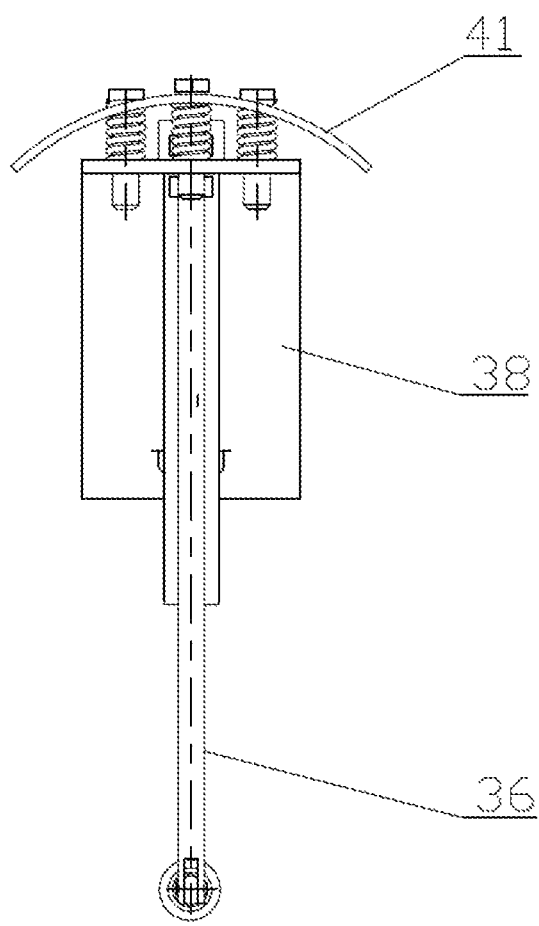
FIG. 10 is a left view of FIG. 7.

Further referring to FIGS. 6-10, the foregoing escape device 30 comprises a support post 36, a clamping device 38 fitted to the support post 36, and a jacking device 40 fitted to the clamping device 38, the support post 36 is mounted fixedly on the wheel 32, the clamping device 38 clamps the auto tyre, and the jacking device 40 protrudes and extends out of a top face 33 of the tyre portion 34. The specific explanation is as follows: the support post 36 is made of metal, and comprises a first support portion 42 and a second support portion 44 approximately perpendicular to the first support portion 42. The top end of the first support portion 42 is fitted to the clamping device 38. The end of the second support portion 42 is provided with a nut 46, the nut 46 can be screwed fixedly on a fixing bolt at the central position of the wheel 32, and thereby the support post 36 is mounted fixedly on the wheel 32. The clamping device 38 comprises a support plate 48 and a binder 50 which are fitted to each other. The support plate 48 is shaped approximately like an L, and is located at a position over the tyre. The support plate 48 is provided with a lengthwise fastening slot 52 at the central position along the length direction thereof, and the fastening slot 52 is provided with a first notch 54 and a second notch 58. The top end of the foregoing first support portion 42 passes through one end of the fastening slot 52, and moreover, an upper nut 56 and a lower nut 56 sheathe the first support portion 42 and are located on the upper side and lower side of the support plate 48 to fixedly clamp the first support portion 42 and the support plate 48. The binder 50 comprises a high-strength nylon strap 51 and a fastening portion 53 and a fixing portion 55 located respectively at both ends of the nylon strap 51. The nylon strap 51 is used for passing through and bind the wheel 32, the fastening portion 53 is fastened with the first notch 54 at the end of the fastening slot 52, the fixing portion 55 is shaped like a block, and is fastened with the second notch 58 of the fastening slot 52, and the second notch 58 is close to the first support portion 42. The jacking device 40 is mounted at the end of the support plate 48, and comprises a jacking head 41, at least one bolt 43, and an elastic element 45 sheathing each bolt 43. The jacking head 41, which is made of metal, is located over the support plate 48 and shaped approximately like a circular arc. The jacking head 41 and the support plate 48 are provided respectively with bolt holes 47 corresponding to the bolts 43, and the bolts 43 are fitted into the bolt holes 47 and fixedly connect the jacking head 41 and the support plate 48 together. Corresponding to the present embodiment, there are three bolts 43, and the jacking head 41 or the support plate 48 is provided with three bolt holes 47 as well. The elastic elements 45 are springs sheathing the bolts 43 and are located between the jacking head 41 and the support plate 48.

When the auto tyre is trapped in a pit or skids, an escape method of the portable escape device for self-rescue in the case of an auto tyre being trapped in a pit in the present embodiment comprises the following steps: (1) the clamping device is mounted, more specifically, the clamping device 38 on which the jacking device 40 has been mounted is arranged at an appropriate position on the auto tyre, and the nylon strap 52 of the binder 50 passes through the wheel 32 and tightly holds the auto tyre; (2) the support post is mounted, more specifically, the first support portion 42 of the support post 36 is fastened fixedly with both the clamping device 38 and the jacking device 40, and the nut on the second support portion 44 of the support post is screwed down on the fixing bolt at the central position of the wheel of the auto tyre; (3) an automobile is started for escape; as the auto tyre is started, the trapped tyre rotates and drives the jacking device 40 to rotate together until the jacking head 41 abuts against the pit ground; as the jacking head 41 protrudes and extends out of the surface of the auto tyre, the trapped tyre is jacked up in a "jacking" manner and gets out of the pit ground, consequently, self-rescue is implemented successfully, and the escape device is quick, safe and reliable.

Embodiment 2

Figure 11:
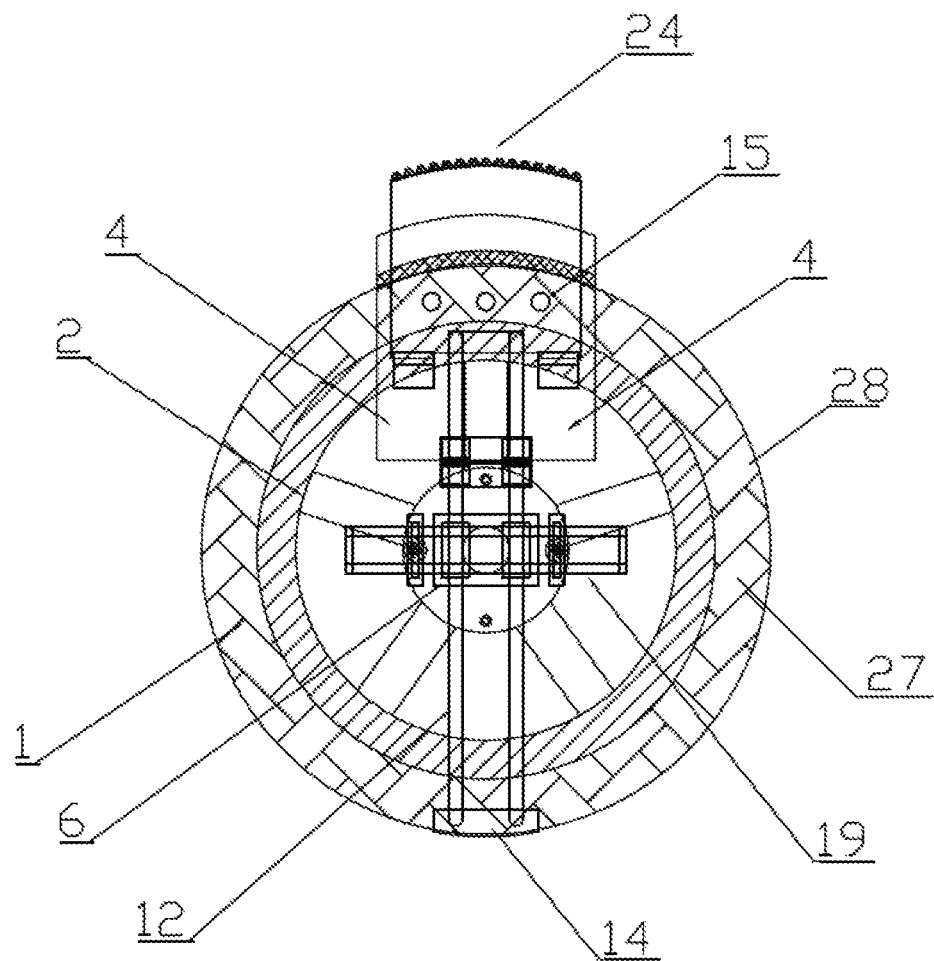
FIG. 11 is an assembly view of the portable escape device for self-rescue in the case of an auto tyre being trapped in a pit corresponding to the second embodiment of the present invention and the auto tyre.
Figure 12:
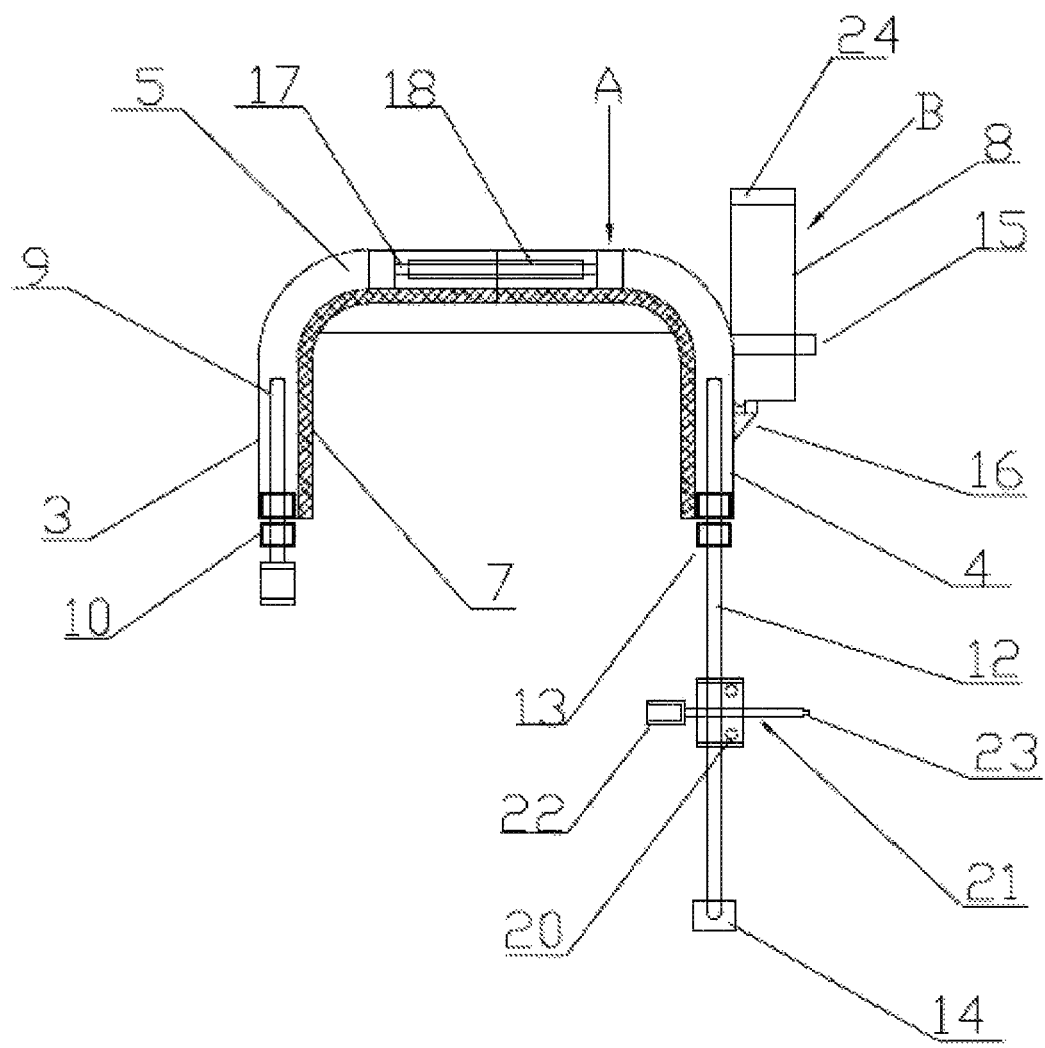
FIG. 12 is a plane view of the escape device in FIG. 11.
Figure 13:
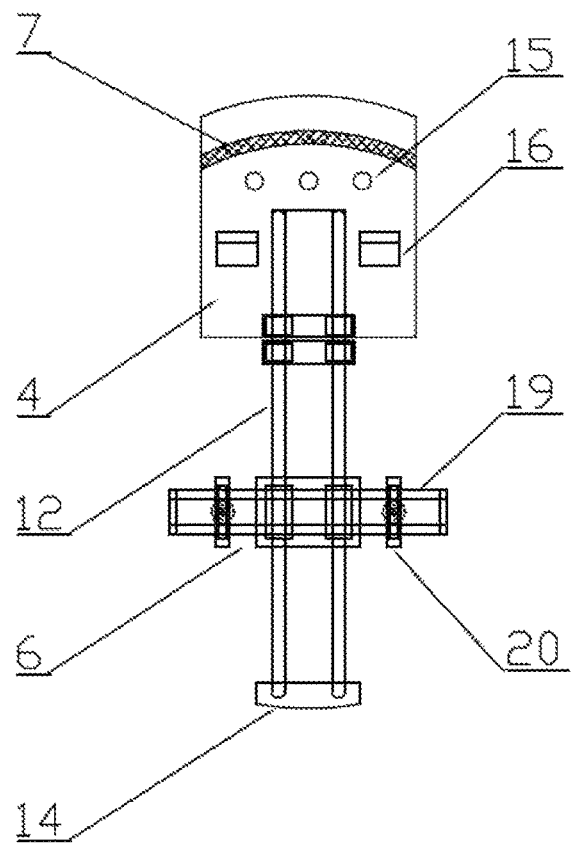
FIG. 13 is a right view of FIG. 12.
Figure 14:
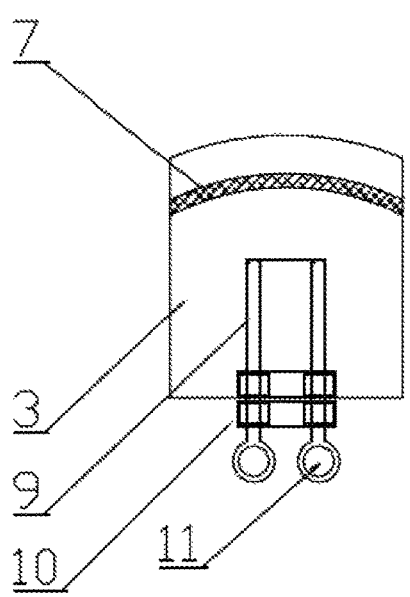
FIG. 14 is a diagram of part of parts of FIG. 12.
Figure 15:
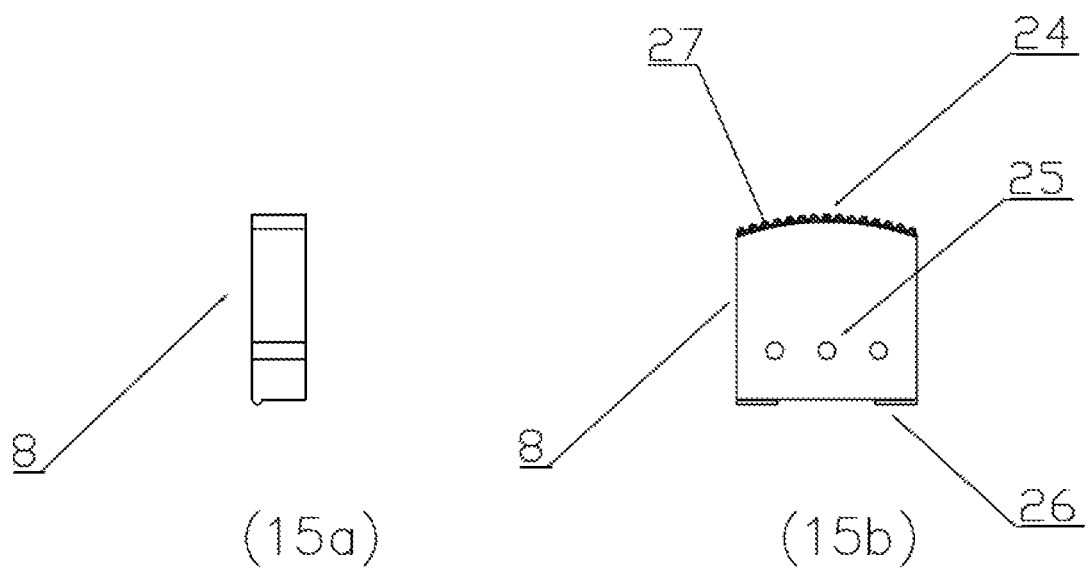
FIGS. 15*a*-15*b* are diagrams of the other part of parts of FIG. 12.

Further referring to FIGS. 11-15*b*, what is shown is the portable escape device for self-rescue in the case of an auto tyre being trapped in a pit corresponding to the second embodiment of the present invention, which also comprises support posts 12, a clamping device A fitted to the support posts 12, and a jacking device B fitted to the clamping device A, the support posts 12 are mounted fixedly on wheel 2 of an auto tyre 1, the clamping device A clamps the auto tyre 1, and the jacking device B protrudes and extends out of a top face 28 of the tyre portion 27.

Corresponding to the present embodiment, two support posts 12 which are parallel with each other are arranged, and the upper end of each support post 12 is connected movably to the clamping device A through two sets of external sliders 13, while a bottom support 14 is mounted at the other bottom end. A cross slide bar 19 and a cross slider 20 are arranged slidably in the middle of each support post, a screw 21 is mounted on the cross slider 20, a nut 22 is arranged at primary end of the screw 21, a square spanner 23 is arranged at the secondary end, and the nut 22 is fitted to a bolt (not shown in the drawings) at the central position of the wheel 2.

The clamping device A comprises a claw portion and internal slide rods 9 which are fitted slidably together, wherein the claw portion comprises an inner claw 3 clamping the inner surface of the tyre portion 1, an outer claw 4 clamping the outer surface of the tyre portion 1, and an upper claw 5 connected between the inner claw 3 and the outer claw 4 and clamping the top surface of the tyre portion 1. The inside of the claw portion which is in contact with the tyre portion is provided with a rubber liner 7, which is used for protecting the auto tyre 1 and plays the role in increasing frictional force. The inner claw 3 and the internal slide rods 9 are connected movably to each other through two sets of internal sliders 10, and the outer claw 4 and the support posts 12 are connected movably to each other through the foregoing external sliders 13, while the upper claw 5 is provided with a slide way 17 and a guide plate 18 capable of sliding along the slide way 17. Through the foregoing arrangement, the respective lengths of the inner claw 3, the outer claw 4 and the upper claw 5 can be adjusted, and thereby the clamping device A can be adapted to and clamps various specifications of auto tyres. In addition, the ends of the internal slide rods 9 are provided with connecting rings 11, and connecting cables (not shown in the drawings) can be used for fixedly connecting the connecting rings 11 and the wheel 2 together.

The jacking device B comprises lifters 8 and jacking heads 24 fixed on the lifters 8. The lower end of each lifter 8 is provided with pin holes 25, the lifter 8 is mounted fixedly on the outer claw 4 by connecting positioning pins 15 into the pin holes 25, and the secondary end and the jacking head 24 are mounted fixedly together. The bottom of the lifter 8 is provided with fastening legs 26, which are fastened with support blocks 16 arranged on the outer claw 4 for supporting. The jacking heads 24 are made of metal and are curved. The surface of each jacking head 24 is provided with anti-slide ribs 27, and the section of each anti-slide rib 27 is trapeziform. A plurality of lifters 8 of the present embodiment is arranged, and the shapes of the anti-slide ribs 27 of the jacking heads 24 on the different lifters 8 are different in order to be adapted to the different trapped states of the auto tyre.

In addition, an escape method of the escape device of the present embodiment comprises the following steps: (1) the clamping device A is mounted, and more specifically, the lengths of the inner claw 3, the outer claw 4 and the upper claw 5 are adjusted to be adapted to and clamp the tyre; (2) the support posts 12 are mounted, more specifically, the nuts 22 of the two support posts 12 mounted on the outer claw 4 of the clamping device A in advance are aimed at and screwed down on fixing bolts at the central position of the wheel of the auto tyre, and after being adjusted properly, the external sliders 13 are fixed on the outer claw 4; (3) the jacking device B is mounted, and more specifically, the jacking device B is mounted onto the outer claw 4 by the foregoing method; and (4) an automobile is started, and meanwhile, as the automobile is started, the trapped tyre starts to rotate and drives the jacking device B to rotate together until the jacking heads 24 abut against the pit ground; as the jacking heads 24 protrude from the surface of the auto tyre, the trapped tyre is jacked up in a "jacking" manner and gets out of the pit ground, consequently, self-rescue is implemented successfully, and the escape device is quick, safe and reliable. In addition, in the foregoing steps, if needed, the connecting rings 11 on the internal slide rods 9 can also be connected fixedly to the wheel 2 through connecting cables in Step (1), and thus the clamping device A can be more safely and reliably fixed on the auto tyre 1.

To sum up, the portable escape device for self-rescue in the case of an auto tyre being trapped in a pit provided by the present invention not only has a simple structure and is convenient to carry, but also is quick to mount and is safe and reliable. Under the situation of a bad weather, a snow-covered road surface or a harsh road condition, when an auto tyre is trapped in a pit or skids, the escape device can be used for achieving the objective of effective self-rescue and rapid escape, consequently, driving safety is increased, and the occurrence of accidents is reduced. Furthermore, the escape device of the present invention is convenient and quick to assemble and disassemble, so time and labor are saved.

It should be noted that the foregoing preferred embodiments are merely intended to describe the technical concept and characteristics of the present invention. Their purpose is to enable those familiar with this technique to comprehend and implement the content of the present invention, and the protection scope of the present invention cannot be limited hereby. Any equivalent alteration or modification which is made according to the spirit of the present invention shall be covered by the protection scope of the present invention.

What is to be claimed is:

1. A portable escape device for self-rescue in the case of an auto tyre being trapped in a pit, wherein the portable escape device comprises a support post, a clamping device fitted to the support post, and a jacking device fitted to the clamping device; when an auto tyre needs to escape, the support post being fixedly attached to the central disk portion of a wheel, the clamping device clamps the auto tyre, and the jacking device protrudes and extends out of a top face of the trapped auto tyre and is supported on the pit ground, the jacking device comprises a jacking head, the jacking head is in a circular arc;

wherein the support post comprises a first support portion and a second support portion perpendicular to the first support portion, a top end of the first support portion is fitted to the clamping device, the second support portion is provided with a nut, and the second support portion is fitted to a fixing bolt at a central position of the wheel by the nut;

wherein the clamping device comprises a support plate and a binder which are fitted to each other; and wherein the support plate is located over the tyre and provided with a fastening slot, the top end of the first support portion passes through the fastening slot, and the support portion is fixedly attached to the support plate by the nut.

2. The portable escape device for self-rescue in the case of an auto tyre being trapped in a pit according to claim 1, wherein the binder comprises a high-strength nylon strap and a fastening portion and a fixing portion located respectively at both ends of the nylon strap.

3. The portable escape device for self-rescue in the case of an auto tyre being trapped in a pit according to claim 2, wherein the nylon strap binds the wheel, the fastening portion is fastened with a primary end of the fastening slot, and the fixing portion is fastened with a secondary end of the fastening slot and is closer to the first support portion than the fastening portion.

4. The portable escape device for self-rescue in the case of an auto tyre being trapped in a pit according to claim 1, wherein the jacking device comprises at least one bolt, and an elastic element sheathing the bolt.

5. The portable escape device for self-rescue in the case of an auto tyre being trapped in a pit according to claim 4, wherein the jacking head is located over the support plate and approximately shaped like a circular arc.

6. The portable escape device for self-rescue in the case of an auto tyre being trapped in a pit according to claim 5, wherein the jacking head and the support plate are provided respectively with a bolt hole corresponding to the bolt, and the bolt is fitted into the bolt holes and fixedly connect the jacking head and the support plate together.

7. The portable escape device for self-rescue in the case of an auto tyre being trapped in a pit according to claim 6, wherein the elastic element is a spring and is located between the jacking head and the support plate.

8. The portable escape device for self-rescue in the case of an auto tyre being trapped in a pit according to claim 1, wherein the primary end of the support post connected movably to the clamping device (A), and a bottom support is mounted at the secondary end.

9. The portable escape device for self-rescue in the case of an auto tyre being trapped in a pit according to claim 8, wherein a cross slide bar and a cross slider are arranged slidably in the middle of the support post, a screw is mounted on the cross slider, a nut is arranged at a primary end of the screw, a square spanner is arranged at a secondary end, and the nut is fitted to a bolt at a central position of the wheel.

10. The portable escape device for self-rescue in the case of an auto tyre being trapped in a pit according to claim 8, wherein the clamping device (A) comprises a claw and an internal slide rod which are fitted slidably together, wherein the claw clamps the outer surface of a tyre portion and comprises an inner claw, an outer claw, and an upper claw connected between the inner claw and the outer claw.

11. The portable escape device for self-rescue in the case of an auto tyre being trapped in a pit according to claim 10, wherein the inside of the claw which is in contact with the tyre portion is provided with a rubber liner.

12. The portable escape device for self-rescue in the case of an auto tyre being trapped in a pit according to claim 10, wherein the inner claw and the internal slide rod are connected movably, and the outer claw and the support post are connected movably.

13. The portable escape device for self-rescue in the case of an auto tyre being trapped in a pit according to claim 10, wherein the upper claw is provided with a slide way and a guide plate capable of sliding along the slide way.

14. The portable escape device for self-rescue in the case of an auto tyre being trapped in a pit according to claim 10, wherein the jacking device (B) comprises a lifter, the jacking head fixed on the lifter.

15. The portable escape device for self-rescue in the case of an auto tyre being trapped in a pit according to claim 14, wherein a primary end of the lifter is mounted fixedly on the outer claw, and a secondary end is fitted to the jacking head.

16. The portable escape device for self-rescue in the case of an auto tyre being trapped in a pit according to claim 15, wherein a bottom of the lifter is provided with fastening legs, the outer claw is provided with support blocks, and the fastening legs are fitted to the support blocks.

17. The portable escape device for self-rescue in the case of an auto tyre being trapped in a pit according to claim 14, wherein the jacking head is made of metal and is curved.

* * * * *